(No Model.) 3 Sheets—Sheet 2.

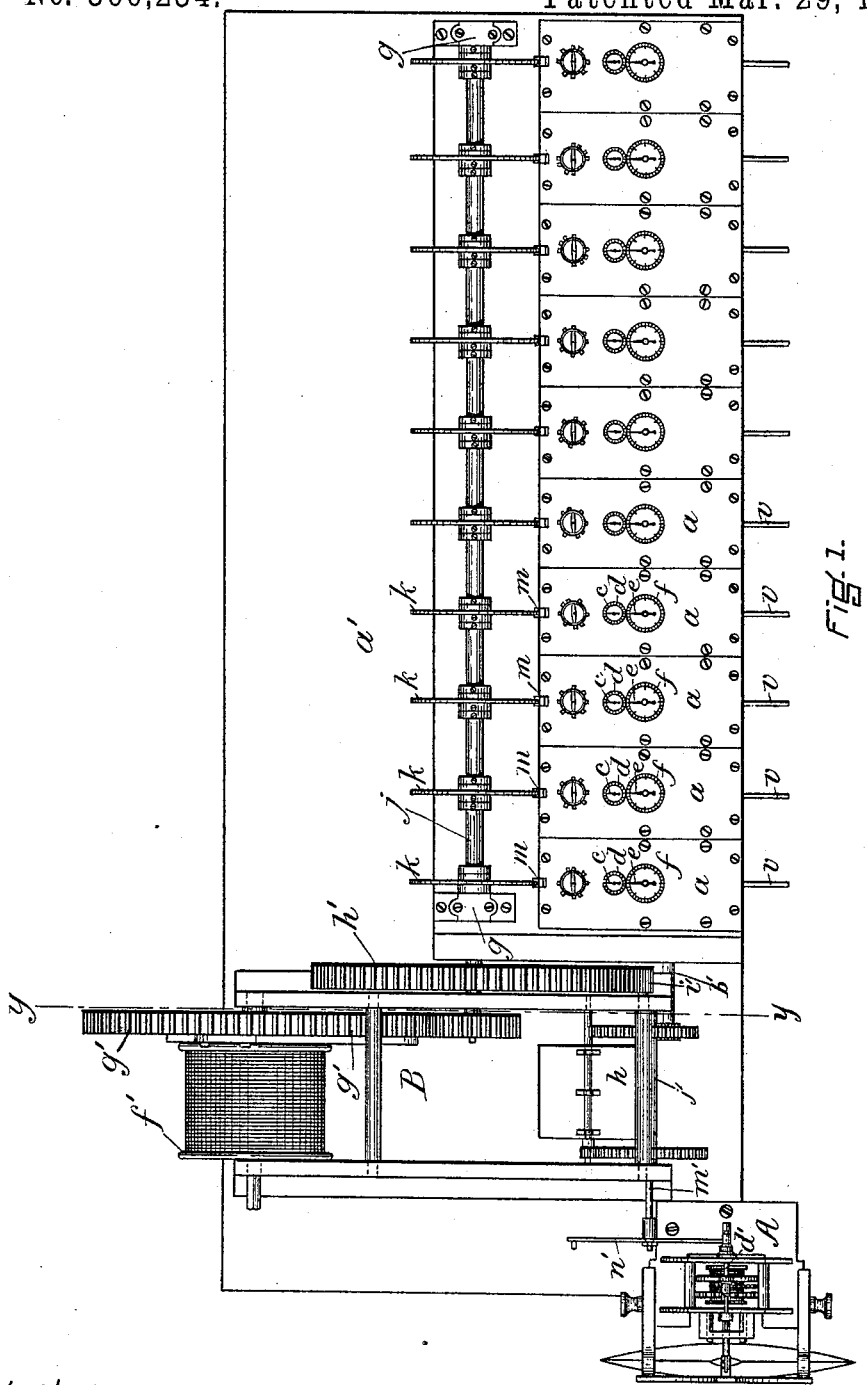

E. A. MARSH, J. LOGAN & D. H. CHURCH.
TESTING AND GRADING WATCH BALANCES AND HAIR SPRINGS.

No. 360,234. Patented Mar. 29, 1887.

WITNESSES.
INVENTORS.

(No Model.) 3 Sheets—Sheet 3.
E. A. MARSH, J. LOGAN & D. H. CHURCH.
TESTING AND GRADING WATCH BALANCES AND HAIR SPRINGS.
No. 360,234. Patented Mar. 29, 1887.
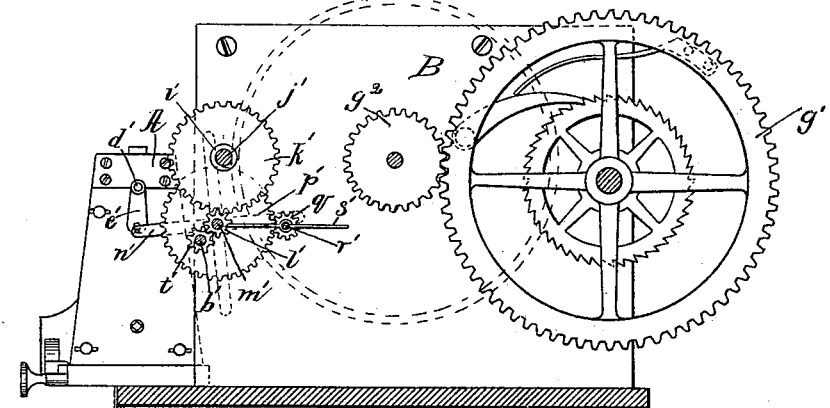
Fig. 4.
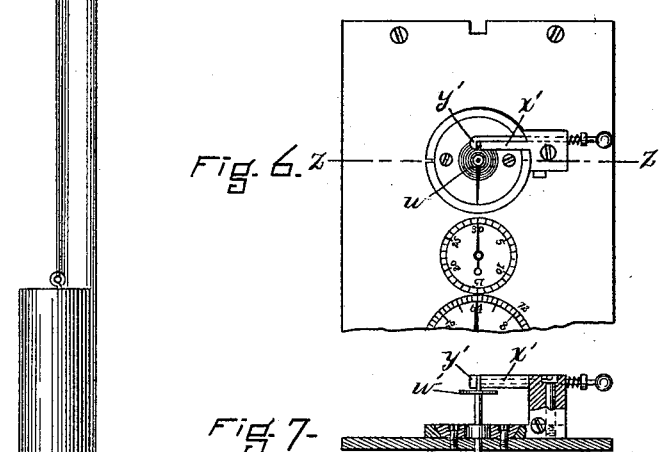
Fig. 6.
Fig. 7.
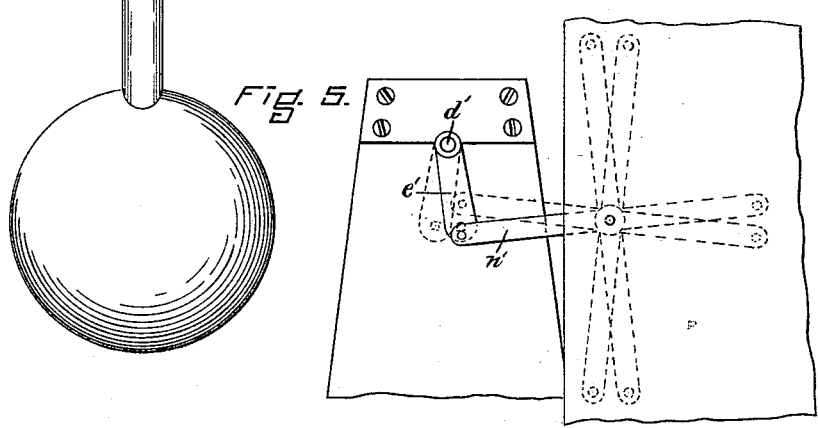
Fig. 5.
WITNESSES
H. Brown
A. D. Harrison.
INVENTORS
E. A. Marsh
John Logan
D. H. Church
by Might, Brown & Emsley
Atty.

UNITED STATES PATENT OFFICE.

EDWARD A. MARSH, OF NEWTON, JOHN LOGAN, OF WALTHAM, AND DUANE H. CHURCH, OF NEWTON, MASSACHUSETTS.

TESTING AND GRADING WATCH-BALANCES AND HAIR-SPRINGS.

SPECIFICATION forming part of Letters Patent No. 360,234, dated March 29, 1887.

Application filed November 15, 1886. Serial No. 218,901. (No model.)

*To all whom it may concern:*

Be it known that we, EDWARD A. MARSH, of Newton, JOHN LOGAN, of Waltham, and DUANE H. CHURCH, of Newton, all in the county of Middlesex and State of Massachusetts, have invented certain new and useful Improvements in Apparatus for Testing and Grading Watch-Balances, of which the following is a specification.

This invention relates to the art or method of testing and grading balances and hair-springs of watches and other time-keepers, by vibrating said balances and hair-springs by means of a standard time-train for a predetermined period and noting the number of vibrations during said period, said method forming the subject of Letters Patent of the United States, No. 329,915, granted to John Logan, November 10, 1885.

The present invention has for its object to provide improved means for starting and stopping the vibrations of the balances or hair-springs, so as to insure their vibration for the exact predetermined period.

The invention also has for its object to enable a series of balances or hair-springs to be tested side by side, and started and stopped independently.

To these ends the invention consists in the improvements which we will now proceed to describe and claim.

Figure 3:
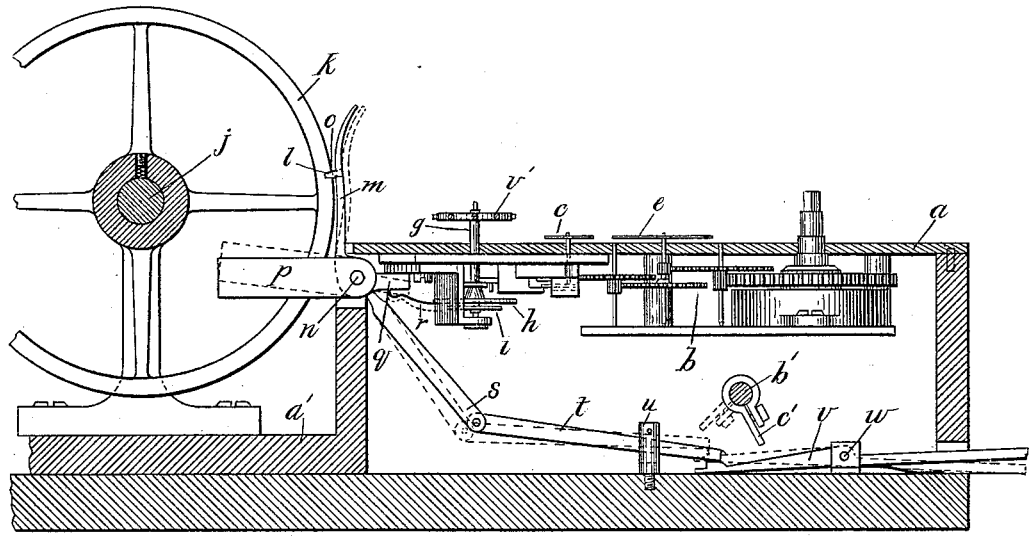
Figure 2:
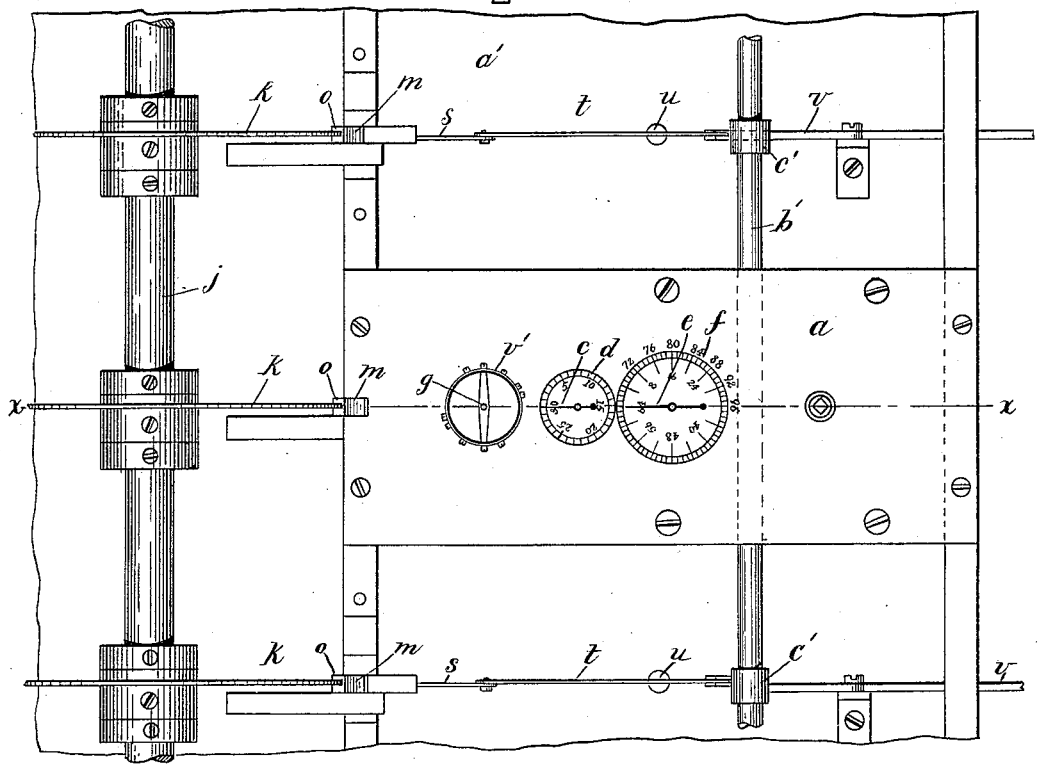

Of the accompanying drawings, forming a part of this specification, Figure 1 represents a top view of a machine embodying our invention. Fig. 2 represents an enlarged top view of a portion of the same. Fig. 3 represents a section on line $x\,x$, Fig. 2. Fig. 4 represents a section on line $y\,y$, Fig. 1. Figs. 5, 6, and 7 represent details.

The same letters of reference indicate the same parts in all the figures.

In the drawings, $a\,a\,a$, &c., represent a series of casings, each having journaled in it the arbors of a standard time-train, $b$, Fig. 3, said casings being placed side by side and secured to a suitable supporting-frame. The arbor of the last or most rapidly-running wheel of each train has a pointer, $c$, which co-operates with a dial, $d$, on the upper plate of the casing, while another arbor of the train has a pointer, $e$, co-operating with another dial, $f$. The two pointers rotate at different rates, the pointer $c$ advancing one step for every vibration of the balance-wheel of the train, while the pointer $e$ advances one step for every complete circuit made by the pointer $c$, so that the two pointers and their dials indicate the total number of vibrations of the balance made in a given period, as hereinafter described.

The balance-staff $g$ of each train has a permanent balance, $h$, and permanent hair-spring $i$, and is fitted at its upper end to detachably hold the balance or the hair-spring to be tested. Each train is adjusted to normally run at a standard rate when carrying a standard balance or spring in its chuck, and when this standard balance is replaced by a balance or a hair-spring to be tested, the variation from the normal rate of vibration indicates the difference between the vibrational weight of the tested balance and that of the standard balance, or the difference between the vibrational strength of the tested spring from that of the standard spring. The balances and springs thus tested will be assorted, all those having the same rate of vibration being kept together, as described in Patent No. 329,915, above referred to.

$j$ represents a long shaft journaled in bearings on the supporting-frame $a'$ and extending substantially parallel with the series of time-trains. Said shaft is rotated at a given rate by mechanism hereinafter described, the rate being in this instance one rotation in five minutes.

On the shaft $j$ are a series of disks, $k$, one for each time-train, said disks coinciding with the casings of said trains, as shown in Fig. 1. The disks $k$ are frictionally connected with the shaft $j$, so that each disk when not locked will rotate with said shaft, but when locked will stand motionless, the shaft continuing to rotate.

In the periphery of each disk is a single notch, $l$, Fig. 3. Against each disk bears a latch, $m$, which is pivoted at $n$ to the frame $a'$, and has a tooth, $o$, adapted to enter the notch $l$, and thus lock the disk $k$, and a weight, $p$, which presses said lever against the disk $k$. The latch $m$ also has an arm, $q$, to which is attached a light spring or yielding terminal, $r$, which, when the tooth $o$ enters the notch $l$, bears against the permanent balance $h$ of the time-train, with which the latch $m$ coincides, and stops the operation of said train; but when the tooth and notch do not coincide the tooth, bearing against the periphery of the disk $k$, keeps the latch in the position shown in dotted lines in Fig. 3, the spring $r$ being thus held away from the balance $h$, so that the time-train is permitted to operate.

An arm, $s$, is rigidly attached to the latch $m$, and to the outer end of said arm is jointed a rod, $t$, which is adapted to slide in a slotted guide, $u$, on the base of the frame $a'$. One end of said rod rests on the inner end of a lever, $v$, which is pivoted at $w$, and projects outwardly from the front of the frame $a'$, so that its outer end may be depressed by the operator to elevate its inner end, and with it the end of the rod $t$ resting thereon.

$b'$ represents a shaft, which is journaled in bearings in the frame $a'$, and is located below and substantially parallel with the series of time-trains. To said shaft are affixed a series of short arms, $c'$, which coincide with the rods $t$, and are adapted to strike and move endwise such of said rods as are raised by the levers $v$. The shaft $b'$ is rotated step by step, but at a considerably more rapid rate than the shaft $j$, by mechanism hereinafter described.

When the outer end of either of the levers $v$ is depressed by the operator, the rod $t$, raised thereby, stands in the path of the coinciding arm $c'$ of the shaft $b'$, and when said arm in its revolution strikes the raised rod it moves the latter endwise, thereby throwing the latch $m$ back from the disk $k$ and removing the tooth of said latch from the notch of the disk, permitting the disk to rotate with the shaft $j$, and at the same time removing the spring $r$ from the balance $h$ of the time-train, so that the latter may resume its operation.

When the notch $l$ of the disk $k$ has moved away from the tooth of the latch $m$, said tooth, bearing on the periphery of the disk $k$, holds the lever in the position to which it was moved by the operation last described until the notch is again brought by the rotation of the disk into coincidence with the tooth, when the tooth drops into the notch, the latch $m$ being thus caused to press the spring $r$ against the balance $h$ of the time-train, as shown in full lines in Fig. 3, and stop the time-train. It will be seen, therefore, that the starting of the time-train is partly automatic, while its stoppage is wholly so, the period of operation of the time-train being exactly that of one rotation of the shaft $j$—in this case five minutes, although it may obviously be more or less.

The object of the automatic portion of the mechanism for starting the time-train—viz., the shaft $b'$, with its arm $c'$, and the devices upon which said arm acts when the lever $v$ is depressed—is to cause the operation of each time-train to commence at a definite point with relation to the operation of the driving mechanism, hereinafter described. To impel the shaft $j$, having the disks $k$, and the shaft $b'$, having the arms $c'$, we employ the mechanism next described.

A represents a clock-movement having what is technically called a "dead-beat escapement," and with a pendulum of such length as to beat seconds. The pallet-arbor $d'$ of this clock is extended through and beyond one of the frame-plates sufficiently to carry a supplemental arm or pallet, $e'$.

B represents a train of gearing driven by a weight suspended by a cord from a drum, $f'$, attached to the main wheel $g'$. Said main wheel meshes with a wheel, $g^2$, on the shaft $j$ and rotates the latter. $h'$ represents a second wheel, which is mounted on the shaft $j$. This second wheel meshes into a pinion, $i'$, on the third shaft, $j'$, which also carries a wheel, $k'$, engaging with pinion $l'$ on the fourth shaft, $m'$. On the end of the fourth shaft is mounted a four-toothed escape-wheel, $n'$. The clock-movement A is so mounted in relation to the four-toothed escape-wheel $n'$ as to bring the arm or pallet $e'$ into operative connection with it.

To insure steadiness of action of the four-armed escape-wheel, there is mounted on the shaft $m'$ a gear, $p'$, engaging with a pinion, $q'$, on shaft $r'$, which carries a fan-wheel, $s'$, so secured as to turn with the shaft, but with sufficient looseness to allow it to slip round when the rotary motion of the shaft is suddenly arrested by the arm of escapement striking the pallet $e'$, the object of this slipping being to avoid a rebound of the escapement.

The shaft $b'$, having the arms $c'$, is provided at one end with a pinion, $t'$, which meshes with a pinion, $l'$, of the same size on the fourth shaft, $m'$, and is therefore caused to rotate in unison with said shaft, which in this case has one-quarter of a complete rotation at each beat of the pendulum. It will be seen, therefore, that as the operation of each time-train is started by an arm, $c'$, of the shaft $b'$, such operation cannot commence until the arm reaches a given point in its rotation, and thus the starting of the time-trains at a given relation to the movements of the pendulum is insured.

In testing balances and hair-springs by this apparatus, the operator places the balance or hair-spring in position on the balance-staff of one of the time-trains, the latter being prevented from operating by the notched disk and the intermediate devices, and then depresses the outer end of the lever $v$ under said train, thus raising the rod $t$, which is thereupon moved by one of the arms of the shaft $b'$, and thus caused to release the disk $k$ and the time-train simultaneously. The time-train continues to operate until the disk $k$ has made a complete rotation, when it is stopped, as already described. The operator then notes and records the entire number of vibrations as indicated by the registering devices, removes the tested balance or hair-spring, and applies another, the above-described operation being then repeated, and so on.

It will be seen that by the employment of a series of trains the operation of testing a number of balances or springs may be going on at the same time, while the operator is removing and supplying other balances or springs. The operator is thus given time to record the rate of each tested balance or spring and replace it with another by the time the next train of the series shall have been stopped. We prefer to employ ten time-trains, and, as before described, time the clock or motor so that each train will run five minutes after it is released or started.

The balances $v'$ to be tested are held by friction on the upper ends of the balance-staffs. When a hair-spring, $w'$, is to be tested, its outer end is held by a fixed arm, $x'$, having a suitable clamping device, $y'$, and its inner end is secured to the balance-staff. (See Figs. 6 and 7.)

It is obvious that so far as the stopping and starting of a balance or hair-spring testing time-train is concerned, our invention is not confined to a series of trains and a corresponding series of stopping and starting devices.

It is obvious, also, that the disks $k$ might be graduated into two or more equal parts, instead of making a complete revolution.

We claim—

1. A testing time-train having holding devices for the article to be tested and provided with indicating or registering devices, combined with a shaft which is rotated at a given rate by a continuously-operating motor, a disk frictionally connected with said shaft and provided with a notch or notches, and a latch bearing against the periphery of said disk and having a train-arresting arm, which is caused by said notch to engage with an operative part of said train, as set forth.

2. A testing time-train having holding devices for the article to be tested and provided with indicating or registering devices, combined with a shaft which is rotated at a given rate, a disk frictionally connected with said shaft and provided with a notch or notches, a latch bearing against the periphery of the disk and having a train-arresting arm, a second shaft, which is also rotated by said continuously-operating motor and is provided with an arm, a finger-lever adapted to be moved by the operator, and mechanism, substantially as described, which is caused by the depression of said finger-lever to make an operative connection between the arm of the second shaft and the lever having the train-arresting arm, as set forth.

3. The combination of a series of time-trains, each having holding devices for the article to be tested and provided with indicating or registering devices, a shaft impelled at a given rate by a continuously-operating motor, a series of notched disks frictionally connected with said shaft, and a series of latches corresponding with the disks, each adapted to engage automatically with a notch on the corresponding disk and each provided with a train-arresting arm, as set forth.

4. The combination of a series of time-trains, each having holding devices for the article to be tested and provided with indicating or registering devices, a shaft impelled at a given rate by a continuously-operating motor, a series of notched disks frictionally connected with said shaft, a series of latches corresponding with the disks, each adapted to engage automatically with a notch on the corresponding disk and each provided with a train-arresting arm, a second shaft rotated by said motor and provided with a series of arms, a series of finger-levers adapted to be moved by the operator, and a series of intermediate devices, substantially as described, whereby when any finger-lever is depressed an operative connection is established between the corresponding train-arresting lever and the corresponding arm of the second shaft, as set forth.

5. The combination of a gear, train, or motor, as B, a shaft, $j$, impelled by said motor, a series of time-trains, each having holding devices for the article to be tested, a series of notched disks frictionally mounted on the shaft $j$, and time-train holding and releasing devices, substantially as described, which are made operative to hold any train of the series when the notch in the corresponding disk reaches a given point and are held inoperative by the periphery of the disk when the notch is not at said given point, as set forth.

6. The combination of a gear, train, or motor, as B, a shaft, $j$, impelled by said motor, a series of time-trains, each having holding devices for the article to be tested, a series of notched disks frictionally mounted on the shaft $j$, and time-train holding and releasing devices, substantially as described, which are made operative to hold any train of the series when the notch in the corresponding disk reaches a given point, and are held inoperative by the periphery of the disk when the notch is not at said given point, a second shaft, $b'$, impelled by the motor B, and having a series of arms, a series of levers adapted to be moved by the operator, a series of intermediate devices, substantially as described, co-operating with said fingers and with the arms of the shaft $b'$, to release the time-trains, and a clock-movement, A, which is impelled by and controls the operation of the motor B, substantially as set forth.

In testimony whereof we have signed our names to this specification, in the presence of two subscribing witnesses, this 5th day of November, 1886.

EDWARD A. MARSH.
JOHN LOGAN.
DUANE H. CHURCH.

Witnesses:
DANIEL W. ELDREDGE,
HENRY N. FISHER.